(12) United States Patent
Mußmann et al.

(10) Patent No.: US 8,389,432 B2
(45) Date of Patent: Mar. 5, 2013

(54) STRUCTURED AUTOMOTIVE CATALYST WITH IMPROVED THERMAL AGEING STABILITY

(75) Inventors: Lothar Mußmann, Offenbach (DE); Nicola Söger, Frankfurt am Main (DE); Ralf Sesselmann, Ranstadt (DE); Katja Adelmann, Rodenbach (DE); Wolfgang Schneider, Rodenbach (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 603 days.

(21) Appl. No.: 11/774,281

(22) Filed: Jul. 6, 2007

(65) Prior Publication Data
US 2008/0075646 A1  Mar. 27, 2008

(30) Foreign Application Priority Data
Sep. 25, 2006  (EP) .................. 06019975

(51) Int. Cl.
| | |
|---|---|
| *B01J 29/04* | (2006.01) |
| *B01J 29/06* | (2006.01) |
| *C01B 33/36* | (2006.01) |
| *B01D 53/46* | (2006.01) |
| *B01D 53/56* | (2006.01) |

(52) U.S. Cl. ............ 502/60; 502/64; 423/700; 423/210; 423/235

(58) Field of Classification Search .................. None
See application file for complete search history.

(56) References Cited

U.S. PATENT DOCUMENTS

| | | | | |
|---|---|---|---|---|
| 4,188,364 A | * | 2/1980 | Gladden | .......... 423/213.2 |
| 5,409,671 A | * | 4/1995 | Takemoto et al. | .......... 422/180 |
| 6,395,675 B1 | * | 5/2002 | Suga et al. | .......... 502/326 |
| 6,497,848 B1 | * | 12/2002 | Deeba et al. | .......... 422/180 |
| 6,677,264 B1 | | 1/2004 | Klein et al. | |
| 2002/0068679 A1 | * | 6/2002 | Yan et al. | .......... 502/66 |
| 2005/0164879 A1 | | 7/2005 | Chen | |
| 2005/0282701 A1 | | 12/2005 | Foong et al. | |
| 2006/0062704 A1 | * | 3/2006 | Liu et al. | .......... 422/177 |
| 2008/0125309 A1 | * | 5/2008 | Fujdala et al. | .......... 502/74 |

FOREIGN PATENT DOCUMENTS

| | | |
|---|---|---|
| DE | 198 54 794 | 5/2000 |
| DE | 103 60 955 A1 | 7/2005 |
| DE | 10 2006 031724 | 7/2006 |

(Continued)

OTHER PUBLICATIONS

1. European Search Report and Communication, dated Feb 23, 2007.

(Continued)

*Primary Examiner* — Melvin C Mayes
*Assistant Examiner* — Sheng H Davis
(74) *Attorney, Agent, or Firm* — Levin Santalone LLP; John Santalone

(57) ABSTRACT

Structured automotive catalysts which comprise a plurality of different catalytically active coatings arranged above one another on a support body and whose coatings contain transition metals and porous support materials are well known. Structured automotive catalysts of this type which do not belong to the group of three-way catalysts, in particular, frequently display large selectivity losses after thermal aging processes which can be attributed to the thermally induced migration of transition metal atoms from one layer into the neighboring coating. The introduction of a diffusion barrier which slows or prevents the thermally induced migration of transition metal atoms from one catalytically active layer into the other increases the thermal aging stability of such catalysts significantly.

2 Claims, 1 Drawing Sheet

FOREIGN PATENT DOCUMENTS

| | | |
|---|---|---|
| EP | 0 393 905 A2 | 10/1990 |
| EP | 1 357 269 A2 | 10/2003 |
| EP | 1 468 721 A1 | 10/2004 |
| EP | 1 795 724 A | 6/2007 |
| JP | 57 105240 A | 6/1982 |
| JP | 07 096183 A | 4/1995 |
| JP | 2005-238199 | 9/2005 |
| WO | WO 95/35152 A | 12/1995 |
| WO | WO 97/02886 A | 1/1997 |
| WO | WO 99/56859 A | 11/1999 |
| WO | WO 00/29728 A1 | 5/2000 |
| WO | WO 2005/064130 A | 7/2005 |
| WO | WO 2006/022214 A | 3/2006 |
| WO | WO 2006/044974 A | 4/2006 |
| WO | WO 2008/006427 A | 1/2008 |

OTHER PUBLICATIONS

2. International Search Report dated Oct 5, 2007.
3. English translation of Written Opinion of the International Searching Authority.
Pending U.S. Appl. No. 12/307,696, filed Jan. 6, 2009.

* cited by examiner

STRUCTURED AUTOMOTIVE CATALYST WITH IMPROVED THERMAL AGEING STABILITY

BACKGROUND OF THE INVENTION

The present invention is related to the improvement of the thermal aging stability of a structured automotive exhaust gas catalyst which is composed of a plurality of different catalytically active layers arranged above one another on a carrier, wherein the catalytically active layers comprise transition metals and porous support materials.

Catalysts for purifying the exhaust gases from internal combustion engines in motor vehicles, known as automotive catalysts, which are made up of various catalytically active layers arranged above one another on a carrier are well known and frequently have significant advantages in terms of their conversion behaviour and in particular in terms of their selectivity properties in the freshly produced state compared to catalyst formulations which are made up of the same type of catalytically active layers. The improved selectivity properties of these catalyst formulations are due to the exhaust gas to be purified having to come into contact in succession with a plurality of catalyst layers having different modes of action. As a result, the reaction paths of individual exhaust gas components can be controlled in a targeted manner and parallel reactions in which undesirable secondary emissions are produced can be prevented.

In particular, automotive exhaust gas catalysts which are to be used in motor vehicles having a predominantly stoichiometrically operated internal combustion engine, known as three-way catalysts, are typically made up of a plurality of different catalytically active coatings. These have been described in a very large number of patent applications and articles of the relevant technical literature.

For example, WO 95/35152 discloses a polyfunctional catalyst which is stable up to a temperature of 900° C. and simultaneously oxidizes hydrocarbons and carbon monoxide and reduces nitrogen oxides. This catalyst comprises a first, inner catalyst layer containing a first carrier material and a first palladium compound and optionally a first platinum group compound, at least one stabilizer and at least one compound of the rare earth metals and optionally a zirconium compound; and a second, outer catalyst layer containing a second support material, a second platinum compound, a rhodium component, oxygen storage components and optionally zirconium.

Furthermore, US 2005/0282701 describes a three-way catalyst which comprises a plurality of catalytically active layers and contains the palladium and platinum in the bottom layer applied directly to the carrier and rhodium and platinum in the second layer facing the exhaust gas. In addition, a "base coating" containing an oxygen-storage-material can be inserted between the carrier and the first layer in order to match the oxygen storage content of the overall catalyst to the appropriate vehicle application without changing the composition of the catalytically active coatings.

WO 06/044974 describes a catalyst composition which has a first layer containing a platinum component and a support material and on top of this a second layer containing a second support material and a sulphur oxide sorbent.

Structured automotive catalysts having various superposed, catalytically active layers have also been developed for other types of vehicles.

Thus, DE 198 54 794 describes a catalyst for the purification of the continuously lean exhaust gas of diesel engines which has a nitrogen oxide storage function in a first layer located directly on the carrier and whose second layer which is in contact with the exhaust gas contains a hydrocarbon storage function and catalytically active precious metals of the platinum group, wherein the platinum group metals are deposited on fine-grained, acidic support materials.

JP 2005-238199 describes an ammonia oxidation catalyst as can be used as ammonia barrier catalyst downstream of a catalyst for the selective catalytic reduction of nitrogen oxides in lean exhaust gases using ammonia as reducing agent in order to prevent the emission of excess ammonia. In this catalyst, a layer containing noble metal, which serves to oxidize ammonia, is inserted underneath a coating comprising titanium oxide, zirconium oxide, silicon oxide or aluminum oxide and a transition metal or a rare earth metal.

Unfortunately, structured catalysts which are made up of a plurality of superposed catalytically active layers and do not belong to the group of three-way catalysts, show a significantly larger decrease in conversion, based on the activity in the freshly produced state, and higher selectivity losses after thermal aging than it is the case for catalysts which contain uniform catalytically active coatings. This is a direct consequence of the heterogeneous structure of these structured catalysts.

The catalytically active coatings of such structured automotive exhaust gas catalysts generally comprise one or more transition metals which are applied in a highly dispersed form to a porous support material or are introduced into the pores of such a support material. These transition metals generally represent the reaction sites of the catalytic exhaust gas purification reactions.

For the purposes of the present text, the term "transition metals" encompasses the elements of the Periodic Table in which the d shell is being filled, i.e. all metals of the 4th, 5th and 6th periods which belong to the transition groups. Preference is given to using the metals of Groups VIII and IB in catalytically active coatings, in particular iron, copper and the noble metals ruthenium, rhodium, palladium, iridium, platinum, silver and gold. Excluded is technetium due to its undesirable radioactive properties.

As porous support materials for the transition metals, use is usually made of refractory oxides with a high surface area. Suitable support materials are, for example, γ-alumina, silica, aluminum silicates, zeolites, zirconia, titania, titanium-zirconium mixed oxides, the rare earths, in particular lanthanum oxide, ceria and cerium-zirconium mixed oxides, or mixtures thereof and also ternary oxides having a perovskite, hydrotalcite or spinel structure. An assumption for suitability as support material is, that the porosity of the material is sufficient for the application or introduction of transition metals. Accordingly, oxides which have a particle diameter from 1 to 30 microns and a specific surface area of at least 30 square metres per gram of support material (BET; determined in accordance with DIN 66132) are preferred. Particular preference is given to oxides having a specific surface area of from 50 to 300 square metres per gram of support material, in the case of zeolites from 300 to 800 square metres per gram of support material (BET; determined in accordance with DIN 66132).

Furthermore, there are transition metal oxides that show good catalytic properties and a sufficient porosity. These can be used directly as catalytically active coating without introduction of further transition metals. This applies, for example, to vanadium pentoxide, tungsten trioxide, titanium dioxide, cerium oxide and cerium-zirconium mixed oxides.

Catalytically active coatings which comprise one or more transition metals applied to or introduced into a porous support material or comprise a catalytically active transition metal oxide or comprise combinations thereof are typically applied in a thickness of from 15 to 150 microns per layer and a total layer thickness of from 30 to 300 microns to a carrier in an automotive catalyst. Carriers which can be used are ceramic honeycomb bodies, ceramic wall flow filter substrates, metallic flow-through bodies having parallel channels, ceramic foams and other flow-through substrates.

If a structured automotive catalyst which contains a plurality of superposed, catalytically active layers on a carrier is exposed to high temperatures over a relatively long period of time, adverse interactions between the layers can occur. For example, transition metal atoms which have been applied to the surface of the porous support material may thermally induced leave their adsorption positions and migrate to the interface to the adjacent catalytically active layer. If a sufficiently high concentration of the transition metal atoms is reached at the interface between two different catalytically active layers, they can pass through the interface into the neighbouring layer. The concentration at which such interface penetration occurs is referred to as the threshold concentration. The contamination of the neighbouring catalytically active layer resulting after the threshold concentration has been exceeded causes, that the separation of reaction sites which is usually typical for structured automotive catalysts is no longer being present, so that undesirable parallel reactions may occur. This results in undesirable reaction products and possibly pollutant gases which were not previously present, known as secondary emissions. The selectivity of the catalysts is greatly impaired and possibly destroyed.

For the purposes of the present text, secondary emissions are pollutant gases which do not result directly from the combustion process in the engine (primary emissions) but are produced by catalytic processes in the exhaust gas purification unit. Depending on the type of secondary emission resulting from the selectivity loss, this may also cause a significant decrease in the target conversion. If, for example, methane is formed by reduction of carbon dioxide or nitrogen oxide is formed by oxidation of ammonia used as reducing agent in an undesirable secondary reaction over an aged automobile exhaust gas catalyst, this is reflected in a decrease in the HC or $NO_x$ target conversion which can be measured over the overall exhaust system.

The decrease in the target conversion caused by the loss of activity and/or selectivity during operation at elevated temperatures is an indicator of the stability of the catalyst toward thermal aging processes for a person skilled in the art.

SUMMARY OF THE INVENTION

It is therefore an object of the present invention to provide a structured automotive exhaust gas catalyst which contains a plurality of different, catalytically active layers and whose stability to thermal aging is significantly improved.

To achieve this object, a diffusion barrier is arranged between the catalytically active layers in a structured automotive exhaust gas catalyst which contains a plurality of different, superposed, catalytically active layers applied to a carrier. This diffusion barrier slows or prevents the thermally induced migration of transition metal atoms from one catalytically active layer into the other.

For a better understanding of the present invention, reference is made to the following description taken in conjunction with the examples.

DETAILED DESCRIPTION OF THE INVENTION

Figure 1:
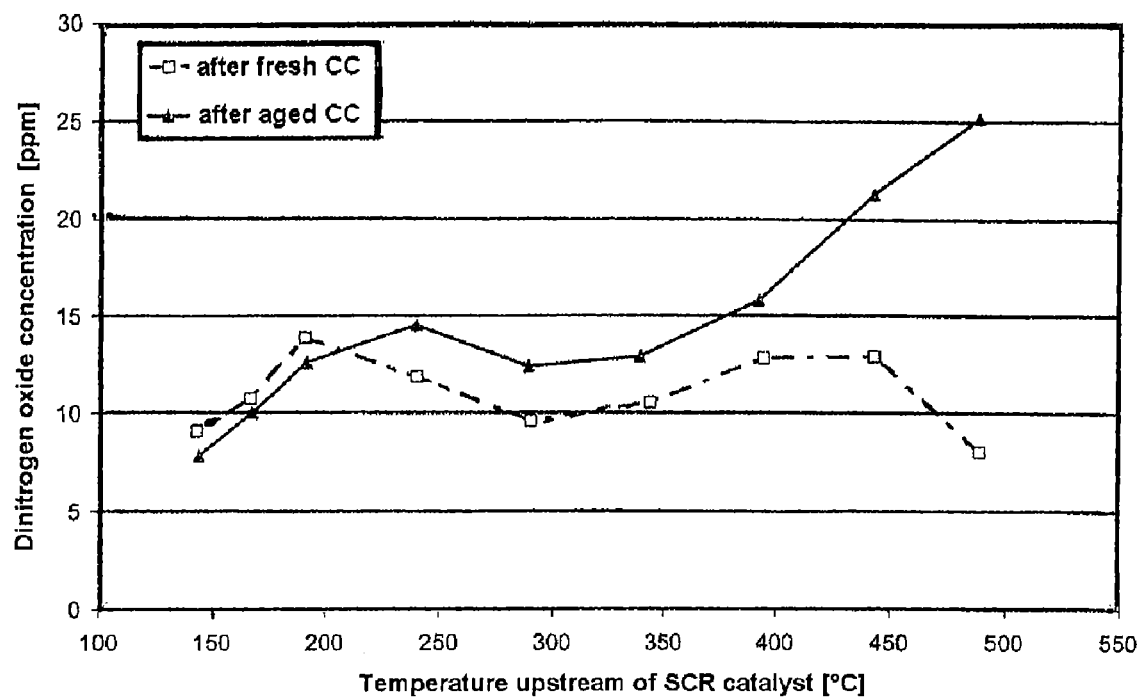
FIG. 1: Dinitrogen oxide concentration of a structured SCR catalyst according to the prior art, comprising two different, catalytically active layers which are arranged one above the other on a ceramic honeycomb carrier, in the freshly produced state and after hydrothermal aging.

In preparing the preferred embodiments of the present invention, various alternatives may be used to facilitate the objectives of the invention. These embodiments are presented to aid in an understanding of the invention and are not intended to, and should not be construed to, limit the invention in any way. All alternatives, modifications and equivalents that may become obvious to those of ordinary skill upon a reading of the present disclosure are included within the spirit and scope of the present invention.

In the present invention a diffusion barrier is arranged between the catalytically active layers in a structured automotive exhaust gas catalyst which contains a plurality of different, superposed, catalytically active layers applied to a carrier. Preference is given to using diffusion barriers comprising oxidic materials. This ensures, firstly, that the adhesion between the, likewise oxidic, catalytically active layers is not irreversibly destroyed. Secondly, such a choice ensures that the diffusion of the exhaust gas to be purified from one catalytically active coating into the other is not significantly hindered by the barrier layer located in between.

The effect of the diffusion barrier can, depending on the material used and the purification task of the structured automotive catalyst, be based on a mechanical impact or a chemical impact. Preference is given to diffusion barriers having a chemical barrier impact.

As a preferred embodiment of a diffusion barrier having a chemical barrier impact, use is made of unexchanged zeolites, known as H-zeolites. The effect of these H-zeolites is based thereon, that transition metal atoms which are thermally induced to migrate from a catalytically active coating into the zeolitic barrier layer are chemically fixed faster-moving, smaller protons are liberated. The transition metal atoms are fixed chemically at the adsorption sites of the protons. Their migration is initially stopped. Only when all proton adsorption sites in the zeolitic barrier layer have been occupied by transition metal atoms and when accumulation occurs at the interface with the neighbouring catalytically active layer due to further migration into the barrier layer, so that the threshold concentration is exceeded, the diffusion barrier lose its effectiveness. It is possible to prevent this point from being reached by a dimensioning of the diffusion barrier matched to the concentration of the transition metal atoms in the catalytically active coating.

Zeolites suitable for use as diffusion barriers in structured automotive catalysts for the removal of nitrogen oxides from the exhaust gases of predominantly lean operated internal combustion engines include not only H-zeolites but also, in particular and preferred, ammonium-exchanged zeolites. When transition metal atoms migrate from the adjacent catalytically active layers into the barrier layer comprising ammonium-exchanged zeolites, both protons and ammonia are liberated. Ammonia is temporarily stored in the cage structure of the zeolite and can be used for the reduction of nitrogen oxides in a selective catalytic reduction. Furthermore, hydrocarbon molecules from the exhaust gas can be temporarily stored both in the cage structure of H-zeolites and in the cage structure of ammonium-exchanged zeolites. These hydrocarbon molecules are then likewise available as reducing agents when nitrogen oxides are to be removed from exhaust gases from internal combustion engines operated predominantly under lean conditions.

In another embodiment of the invention, diffusion barriers having a mechanical barrier impact are used. Catalytically inert oxides having small particles, preferably ones whose particle size distribution has a median value $d_{50}$ of not more than 2 microns and an upper value $d_{90}$ of not more than 10 microns, where the specified parameters of the particle size distribution are determined by means of laser-optical methods, are suitable for this purpose. The specific surface area of the catalytically inert oxides should be less than 100 square metres per gram of oxide, preferably less than 50 square metres per gram of oxide, exceptionally preferably less than 20 square metres per gram of oxide (BET; determined in accordance with DIN 66132). The barrier impact of such diffusion barriers is based on their porosity being too low for unhindered passage of transition metal atoms through the interface into the barrier layer to be able to take place. The positioning of such a barrier layer between two catalytically active coatings accordingly leads to a significant increase in the threshold concentration. Dense layers of fine milled alumina, silica, titanium dioxide or titanates are well suited for use as mechanical diffusion barriers. They preferably have layer thicknesses of less than 50 microns, exceptionally preferably less than 25 microns.

The invention is illustrated below with the aid of a comparative example, an example and two figures. The figures show:

FIG. 1: Dinitrogen oxide concentration of a structured SCR catalyst according to the prior art, comprising two different, catalytically active layers which are arranged one above the other on a ceramic honeycomb carrier, in the freshly produced state and after hydrothermal aging.

Figure 2:
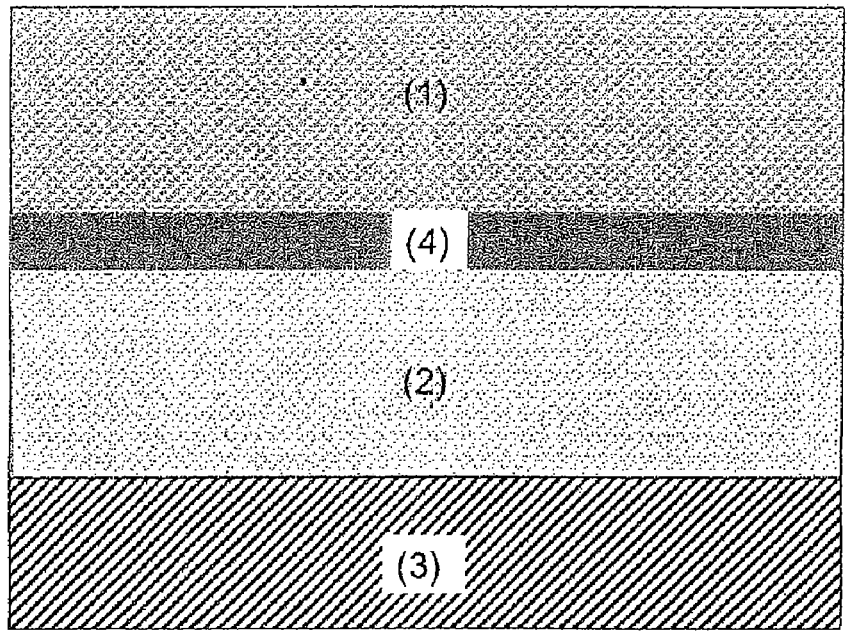
FIG. 2: Structure of a structured automotive exhaust gas catalyst according to the invention comprising two superposed, different, catalytically active layers (1) and (2) which have been applied to a carrier (3) with a diffusion barrier (4) located between them.

FIG. 2: Structure of a structured automotive exhaust gas catalyst according to the invention comprising two superposed, different, catalytically active layers (1) and (2) which have been applied to a carrier (3) with a diffusion barrier (4) located between them.

COMPARATIVE EXAMPLE

In this comparative example, the thermal aging behaviour of a structured catalyst for the selective catalytic reduction (SCR) of nitrogen oxides comprising two different, superposed, catalytically active layers on an inert ceramic honeycomb carrier with ammonia as reductant was examined. To produce the catalyst, hereinafter designated as CC, a coating comprising 6.4 grams of a copper-exchanged zeolite was applied to an inert ceramic honeycomb carrier having a volume of 0.04 litre, 62 cells per square centimetre and a cell wall thickness of 0.17 millimeter. The coated piece was calcined at 500° C. in air for 2 hours to ensure good adhesion of the coating. A further coating comprising 2 grams of an iron-exchanged zeolite was subsequently applied to the catalyst.

The catalyst CC was measured in the freshly prepared state on a stationary model gas test bench. The following gas concentrations were selected for the test:

| Model gas component: | Concentration: |
| --- | --- |
| NO | 500 ppm |
| NH$_3$ | 425 ppm |

-continued

| Model gas component: | Concentration: |
| --- | --- |
| O$_2$ | 5% by volume |
| H$_2$O | 1.3% by volume |
| N$_2$ | Balance |

In studies on the SCR activity, the molar ratio of ammonia to nitrogen oxides is usually designated by alpha:

$$\alpha = \frac{c(NH_3)}{c(NOx)}$$

From the gas concentrations shown in the table results an alpha value of $\alpha=0.85$. The gas hourly space velocity in the model gas tests carried out was 30 000 h$^{-1}$.

Subsequent to the initial measurement, the catalyst CC was subjected to a synthetic, hydrothermal aging procedure. For this purpose, the catalyst CC was exposed to an atmosphere composed of 10% by volume of oxygen and 10% by volume of water vapour in nitrogen for 48 hours in a furnace heated to 700° C. The aged catalyst was then once again subjected to the above-described examination on the model gas test bench.

Since SCR catalysts are used for the reduction of nitrogen oxides in predominantly lean, i.e. oxygen-containing, exhaust gases, there is a risk that the reducing agent ammonia will be converted into dinitrogen oxide (nitrous oxide) in an undesirable secondary reaction, especially at temperatures above 300° C. Such a secondary reaction leads to a reduction in the amount of reducing agent available for the selective catalytic reduction of the primary nitrogen oxides and thereby possibly to a deterioration in the conversion. The nitrous oxide concentration measured downstream of the catalyst is therefore an important magnitude for assessing the selectivity of a SCR catalyst.

FIG. 1 shows the dinitrogen oxide concentrations measured downstream of CC for the fresh prepared state (□) and the hydrothermally aged state (▲) of the catalyst CC.

In the fresh prepared state, the concentration of nitrous oxide downstream of the catalyst remains constant at 11±3 ppm over the entire temperature range. The reaction sites over copper which are primarily responsible for the oxidation of ammonia are located exclusively in the lower layer. If nitrous oxide is formed there by over oxidation of ammonia, this has to diffuse through the upper layer containing iron-exchanged zeolite prior to desorption. The nitrous oxide can react there with stored residual ammonia to form nitrogen and water so that there is no increase in the dinitrogen oxide concentration downstream of the catalyst even at high temperatures. The residual 11±3 ppm of nitrous oxide emitted corresponds to the proportion of N$_2$O secondary emission resulting from oxidation of ammonia at the less oxidation-active iron sites.

During the hydrothermal aging of the catalyst CC, copper atoms are thermally detached from their adsorption sites in the lower layer and migrate into the upper layer, which contains iron-exchanged zeolite. This increases the oxidation activity of the upper layer and therefore an increased over oxidation of the reducing agent ammonia is observed, in particular above 300° C. Dinitrogen oxide is formed and desorbs immediately. The nitrous oxide concentration downstream of the catalyst accordingly increases linearly at temperatures of 350° C. and above and finally reaches values of 25 ppm at 500° C.

Example

In a manner corresponding to the production of the catalyst CC in the comparative example, a ceramic honeycomb carrier having a volume of 0.04 litre, 62 cells per square centimetre and a cell wall thickness of 0.017 millimetres is provided with a coating comprising copper-exchanged zeolite and calcined at 500° C. in air for 2 hours. Before application of the second catalytically active layer comprising iron-exchanged zeolite, an intermediate coating comprising unexchanged zeolite and ammonium-exchanged zeolite is applied and renewed calcination is carried out at 500° C. in air for 2 hours.

Therefore the nitrous oxide concentration downstream of the aged catalyst can be reduced to concentrations below 15 ppm over the entire temperature range, due to the chemical barrier impact of the intermediate layer inserted as diffusion barrier, which prevents the thermally induced migration of copper atoms into the upper layer containing iron-exchanged zeolite.

What is claimed is:

1. A structured SCR automotive exhaust gas catalyst comprising in layered sequence, a first catalytically active layer on a carrier, an intermediate diffusion barrier, and a second catalytically active layer having a different mode of action than that of the first layer,
    wherein each of the two catalytically active layers contains transition metal atoms and porous support materials,
    wherein the diffusion barrier slows or prevents thermally induced migration of the transition metal atoms from one catalytically active layer into the other, the barrier being located between the two catalytically active layers, and
    wherein the diffusion barrier has a chemical barrier impact and contains unexchanged zeolite ("H-zeolite") or ammonium-exchanged zeolite or combinations thereof.

2. Structured automotive exhaust gas catalyst according to claim 1, wherein the transition metal atoms of one catalytically active layer consist essentially of copper and the transition metal atoms of the other catalytically active layer consist essentially of iron.

* * * * *